(12) United States Patent
Osborne

(10) Patent No.: US 7,886,069 B2
(45) Date of Patent: Feb. 8, 2011

(54) VIDEO DISTRIBUTION SYSTEM INCLUDING PROGRESSIVE PLAYBACK

(75) Inventor: Roland Osborne, San Diego, CA (US)

(73) Assignee: DIVX, LLC, San Diego, CA (US)

( * ) Notice: Subject to any disclaimer, the term of this patent is extended or adjusted under 35 U.S.C. 154(b) by 156 days.

(21) Appl. No.: 11/970,493

(22) Filed: Jan. 7, 2008

(65) Prior Publication Data

US 2008/0168133 A1 Jul. 10, 2008

Related U.S. Application Data

(60) Provisional application No. 60/883,659, filed on Jan. 5, 2007.

(51) Int. Cl.
*G06F 15/16* (2006.01)
(52) U.S. Cl. .................... 709/231; 709/205; 709/230; 386/68
(58) Field of Classification Search .............. 709/231, 709/205, 230; 386/68
See application file for complete search history.

(56) References Cited

U.S. PATENT DOCUMENTS

| 6,742,082 | B1 | 5/2004 | Lango et al. | |
|---|---|---|---|---|
| 7,734,806 | B2 * | 6/2010 | Park ......................... | 709/232 |
| 2003/0077071 | A1 * | 4/2003 | Lin et al. ..................... | 386/68 |
| 2006/0093318 | A1 * | 5/2006 | Cohen et al. ................. | 386/68 |
| 2006/0129909 | A1 | 6/2006 | Butt et al. | |
| 2007/0106863 | A1 * | 5/2007 | Bonwick et al. ............. | 711/170 |
| 2008/0082576 | A1 * | 4/2008 | Bodin et al. ............. | 707/104.1 |
| 2008/0177793 | A1 * | 7/2008 | Epstein et al. ........... | 707/104.1 |
| 2009/0067367 | A1 * | 3/2009 | Buracchini et al. .......... | 370/328 |

OTHER PUBLICATIONS

Adobe—Development Center: Flash video learning guide, printed Jan. 13, 2009 from http://www.adobe.com/devnet/flash/articles/video_guide_02.html, 5 pgs.
RedOrbit News, New DivX Web Player Hits 1 Milling Downloads in One Week, printed Jan. 13, 2009 from http://www.redorbit.com/modules/news/tools.php?tool=print&id=421307, 2 pgs.

(Continued)

*Primary Examiner*—John Follansbee
*Assistant Examiner*—Glenford Madamba
(74) *Attorney, Agent, or Firm*—Kauth, Pomeroy, Peck & Bailey LLP

(57) ABSTRACT

A receiver driven approach for playback of remote content is described. One embodiment includes obtaining information concerning the content of the media file from the remote server, identifying a starting location within the media sequence, identifying byte ranges of the media file corresponding to media required to play the media sequence from the starting location, requesting the byte ranges required to play the media sequence from the starting location, buffering received bytes of information pending commencement of playback, playing back the buffered bytes of information, receiving a user instruction, identifying byte ranges of the media file corresponding to media required to play the media sequence in accordance with the user instruction, flushing previous byte range requests, and requesting the byte ranges required to play the media in accordance with the user instruction.

20 Claims, 9 Drawing Sheets

OTHER PUBLICATIONS

Fielding et al., "Hypertext Transfer Protocol—HTTP1.1", Network Working Group, Jun. 1999, 114 pgs.

International Search Report for International Application No. PCT/US2008/050440, International Filing Date Jan. 7, 2008, Search completed Apr. 23, 2008, mailed May 16, 2008, 2 pgs.

Written Opinion of the International Searching Authority for International Application No. PCT/US2008/050440, International Filing Date Jan. 7, 2008, Opinion completed Apr. 23, 2008, mailed May 16, 2008, 9 pages.

* cited by examiner

VIDEO DISTRIBUTION SYSTEM INCLUDING PROGRESSIVE PLAYBACK

CROSS-REFERENCE TO RELATED APPLICATIONS

The current application claims priority to U.S. Provisional Application No. 60/883,659, filed Jan. 5, 2007, the disclosure of which is incorporated herein by reference.

BACKGROUND

The present invention relates generally to playing multimedia files over a network and more specifically to the progressive playback of multimedia files as they are downloaded over a network.

Progressive playback is the idea of playing back remote content as it is being downloaded. With this feature a user can select a remote movie and commence watching it before it is fully downloaded. Even with a fast Internet connection, waiting for a movie to fully download can range from minutes to hours depending on the size of the media file. With progressive playback a user only has to wait a couple of seconds before playback can begin.

Current implementations of receiver or player driven progressive playback, while suitable for the short video clips that are dominant in many current applications, are typically limited in the scope and flexibility of the progressive playback they provide. Players typically download files linearly from the beginning to the end. Playback then begins when the player has buffered enough data to provide a likelihood that the media will play without interruption. The buffering requirement can either be a fixed amount suitable for a large percentage of content, or a dynamic amount, where the player infers how much data is required to play the entire content without suffering buffer under-run. Although suitable for playback of short video clips, these methods typically do not support random seeking, trick-play and playback of remotely stored longer content such as feature length movies.

Some systems are implemented with a server driven approach. Examples of server driven approaches include the systems described in U.S. patent application Ser. Nos. 11/323,044, 11/323,062, 11/327,543, and 11/322,604, the disclosure of which is incorporated herein by reference in its entirety. In these systems, the server parses the data file and determines which data to send. Network efficiency and flexibility in playback becomes a much easier task. Standard HTTP web servers however do not typically provide this functionality, and custom web servers providing this functionality often scale poorly when called upon to deliver content simultaneously to a large number of players.

Browser based players often implement receiver driven playback by parsing the video file as it is downloaded linearly. When a long clip is started, it is impossible to seek or fast-forward to a point in the file that has not already been downloaded. Samba (open source software available at http://us2.samba.org/samba/) can be used to give any application access to a remote file as if it were a local file. It tries to minimize the access latency by pre-caching data from the current file position, which can be randomly set. This may be insufficient when trying to perform "trick play" functions (e.g. performing functions such as rewinding, fast forwarding and skipping between scenes that require non-sequential access of media content). The video frames to be delivered to the player in these scenarios can be spaced far apart or require more complex ordering, greatly diminishing the utility of traditional pre-caching methods which are based on assumptions regarding the subsequent video frames to be viewed.

SUMMARY OF THE INVENTION

Systems and methods are described for performing progressive playback and "trick play" functions on partially downloaded media files. Many embodiments of the invention include a receiver or player driven system supporting features such as the maintenance at all times of a full capacity download stream of only certain required data, including data in certain byte ranges, the discarding of previous requests, and the issuing of new requests for data at the highest priority. Additionally, several embodiments of the invention include features such as random file access at any point in a file, and asynchronous requests, which provide users flexibility in the playback of a file. In a number of embodiments, the systems and processes support scalability for implementation on Internet servers that store files that can contain multiple titles, titles that include multiple audio tracks, and/or titles that include one or more subtitle tracks.

In several embodiments, the ability to provide full featured progressive playback is due in part to the tight coupling of the playback engine for the media sequence (i.e., the system that decodes and plays back the encoded media) with a transport protocol that provides random access to the remote file. Interfacing of the playback engine with the transport protocol via a file parser can reduce latency and enable the client and media server to operate in parallel improving download efficiency and interactivity. In a number of embodiments, the system and processes are configured for use with files that are formatted to include an index to the data within the file and a transport protocol that allows for downloading specific byte ranges within a file.

One embodiment of the method of the invention includes, obtaining information concerning the content of the media file from the remote server, identifying a starting location within the media sequence, identifying byte ranges of the media file corresponding to media required to play the media sequence from the starting location, requesting the byte ranges required to play the media sequence from the starting location, buffering received bytes of information pending commencement of playback, playing back the buffered bytes of information, receiving a user instruction, identifying byte ranges of the media file corresponding to media required to play the media sequence in accordance with the user instruction, flushing previous byte range requests, and requesting the byte ranges required to play the media in accordance with the user instruction.

A further embodiment of the method of the invention includes, maintaining a mask of the portions of the media file that have been downloaded, identifying that at least a portion of a byte range required to play the media in accordance with the user instruction has already been downloaded using the mask, and requesting only the portions of byte ranges that have not already been downloaded from the media server.

Another embodiment of the method of the invention includes storing downloaded bytes in a data file, and outputting the downloaded media file when all bytes of the media file have been downloaded.

In a still further embodiment of the method of the invention, the data file is a sparse data file.

In still another embodiment of the method of the invention, the media file contains a plurality of media sequences and menu information, and identifying a starting location within the media sequence further includes displaying menu information, receiving a user instruction indicative of the selection of the media sequence, and receiving a user instruction indicative of a starting location within the media sequence.

In a yet further embodiment of the method of the invention, the media sequence includes a plurality of interchangeable audio tracks, identifying a starting location within the media sequence further comprises selecting an audio track, and identifying byte ranges of the media file corresponding to media required to play the media sequence from the starting location further comprises selecting byte ranges that do not include the audio tracks that were not selected.

In yet another embodiment of the method of invention, the media sequence includes a plurality of interchangeable subtitle tracks, identifying a starting location within the media sequence further comprises selecting a subtitle track, and identifying byte ranges of the media file corresponding to media required to play the media sequence from the starting location further includes selecting byte ranges that do not include the subtitle tracks that were not selected.

In a further embodiment again of the method of the invention, the sequence includes key frames, and identifying byte ranges of the media file corresponding to media required to play the media in accordance with the user instruction further includes identifying a sequence of key frames in response to a predetermined user instruction, and identifying byte ranges of the media file corresponding to the identified key frames.

One embodiment of the invention includes a media server, a client, and a network. In addition, the client and the media server are configured to communicate via the network, the client is configured to send requests for at least one portion of the media file to the media server, the server is configured to provide requested portions of the media file to the client, and the client is configured to receive user instructions concerning the playback of the media file and to request portions of the media file that have not been downloaded and that are required to comply with the playback instructions from the media server.

In a further embodiment of the invention, proximate portions of the media file grouped and the groups are requested on an earliest deadline first basis.

In another embodiment of the invention, the client is configured to maintain a queue of requested portions of the media file.

In a still further embodiment of the invention, the client and the server are configured to communicate via at least one connection, and the client is configured to flush the queue of requested portions of the media file and break at least one of the connections in response to the receipt of a predetermined user instruction.

In still another embodiment of the invention, the client is configured to store a file map and a data file, the file map contains a mask indicating the portions of the media file that have been downloaded, and the data file contains the downloaded portions of the media file.

In a yet further embodiment of the invention, the data file is a sparse file.

In yet another embodiment of the invention, the media file includes a media sequence and an index, and the client includes a playback engine configured to obtain the index and determine the portions of the media sequence required to comply with user playback instructions, a file parser configured to use the index to map the portions of the media sequence to portions of the media file and a download manager configured to communicate with the media server to download portions of the media file.

A further embodiment again of the invention includes a user interface configured to receive user instructions, a storage device configured to store at least one media file, a network connection, a download manager configured to asynchronously request at least one byte range of a file from a remotely stored media file via the network connection, a playback engine configured to determine portions of a remotely stored media file that must be downloaded in response to user instructions received via the user interface, and a file parser configured to translate requests for portions of a remotely stored media file to byte ranges and to provide the byte ranges to the download manager.

In another embodiment again of the invention, the download manager is configured to create a status file containing a map of blocks of a media file that have been downloaded, and the download manager is configured to create a data file in which to store blocks of a downloaded media file.

In a further additional embodiment of the invention, the download manager is configured to maintain a queue of requested byte ranges.

In another additional embodiment of the invention, the download manager is configured to flush the queue.

In a still yet further embodiment of the invention, the playback engine is configured to generate a menu using menu information obtained from a remote media file.

In still yet another embodiment of the invention, the playback engine is configured to receive a selection of one of a plurality of media sequences in a remote media file via the menu.

In a still further embodiment again of the invention, the playback engine is configured to receive a selection of one of a plurality of audio tracks for a media sequence in a remote media file via the menu.

In still another embodiment again of the invention, the playback engine is configured to receive a selection of a subtitle track for a media sequence in a remote media file via the menu.

DETAILED DESCRIPTION OF THE INVENTION

Turning now to the drawings, a system for progressively downloading and playing media is shown. In many embodiments, the media is stored in a file on a remote server and a device configured with a client application retrieves portions of the media file and plays the media. The client application typically does not possess the entire media file when it commences playing and can request non-sequential portions of the media file. In this way, the client application can support "trick play" functions. "Trick play" functions impact the playing of a media file such as non-sequential functions including pausing, rewinding, fast forwarding and skipping between scenes. Instead of sequentially downloading a media file and waiting until the required information has been downloaded to perform a "trick play" function, client applications in accordance with embodiments of the invention can determine portions of a media file that are required to support a specific "trick play" function and request those portions of the file from the remote server. When a "trick play" function involves skipping to portions of the media that have not been downloaded, such as fast forwarding and skipping between chapters, latency can be significantly reduced compared to sequential download.

The configuration of a progressive playback system in accordance with an embodiment of the invention can depend upon the container formats supported by the progressive playback system. Examples of container formats include the AVI 1.0 file format specified by Microsoft Corporation of Redmond, Wash. the OpenDML AVI or AVI 2.0 format, container formats similar to the formats specified in U.S. patent application Ser. Nos. 11/016,184 and 11/198,142, the disclosure of which is incorporated herein by reference in its entirety, MPEG-4 Part 15 (MP4) and the open source format known as Matroska (see www.matroska.org). Depending upon the container file format used, a media file can include multiple titles (i.e. media sequences) and each title can include multiple audio tracks and/or one or more subtitle tracks. The container format of a media file influences the manner in which media information within a media file is located. Therefore, the configuration of a progressive playback system is typically determined based upon the container formats supported in a specific application. Although numerous embodiments are discussed below, other variations appropriate to different container formats can be constructed in accordance with embodiments of the invention.

Figure 1:
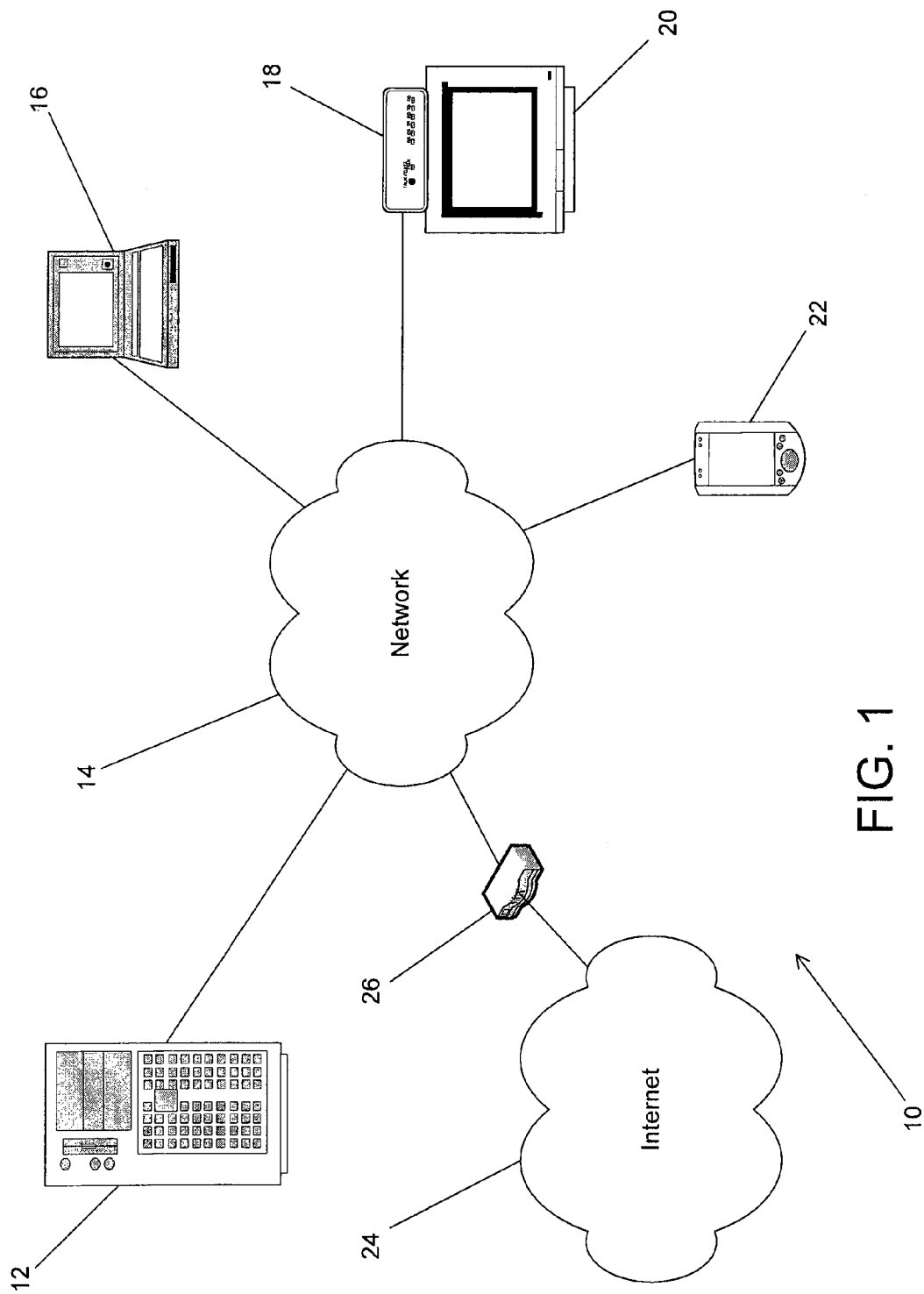
FIG. 1 is a semi-schematic network diagram of progressive playback system in accordance with an embodiment of the invention.

A progressive playback system in accordance with an embodiment of the invention is shown in FIG. 1. The progressive playback system 10 includes a media server 12 connected to a network 14. Media files are stored on the media server 14 and can be accessed by devices configured with a client application. In the illustrated embodiment, devices that access media files on the media server include a personal computer 16, a consumer electronics device such as a set top box 18 connected to a playback device such as a television 20, and a portable device such as a personal digital assistant 22 or a mobile phone handset. The devices and the media server 12 can communicate over a network 14 that is connected to the Internet 24 via a gateway 26. In other embodiments, the media server 14 and the devices communicate over the Internet.

The devices are configured with client applications that can request portions of media files from the media server 12 for playing. The client application can be implemented in software, in firmware, in hardware or in a combination of the above. In many embodiments, the device plays media from downloaded media files. In several embodiments, the device provides one or more outputs that enable another device to play the media. When the media file includes an index, a device configured with a client application in accordance with an embodiment of the invention can use the index to determine the location of various portions of the media. Therefore, the index can be used to provide a user with "trick play" functions. When a user provides a "trick play" instruction, the device uses the index to determine the portion or portions of the media file that are required in order to execute the "trick play" function and requests those portions from the server. In a number of embodiments, the client application requests portions of the media file using a transport protocol that allows for downloading of specific byte ranges within the media file. One such protocol is the HTTP 1.1 protocol published by The Internet Society or BitTorrent available from www.bittorrent.org. In other embodiments, other protocols and/or mechanisms can be used to obtain specific portions of the media file from the media server.

Figure 2:
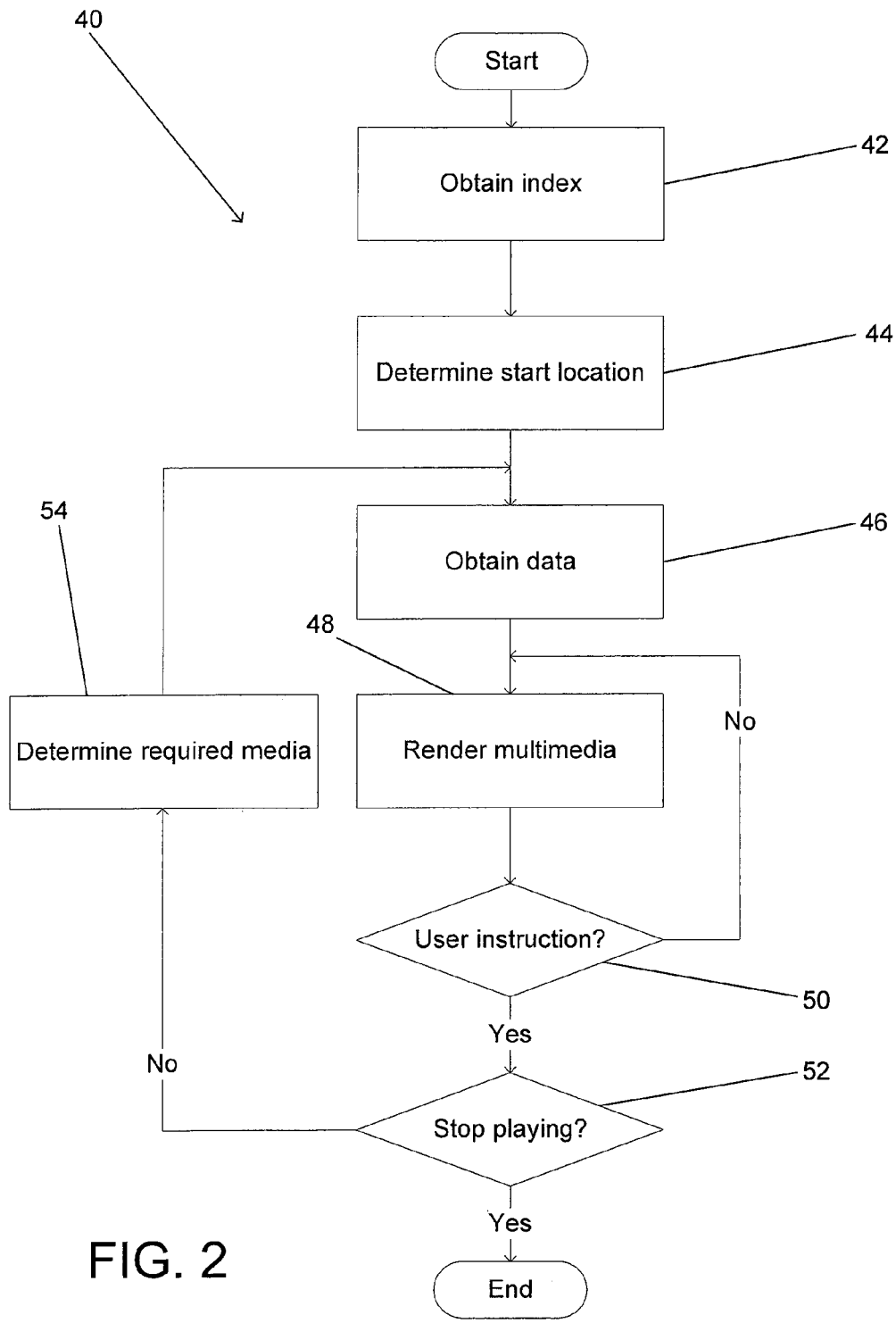
FIG. 2 is a flow chart showing a process for progressively playing back a remotely stored media file in accordance with an embodiment of the invention.

A flow chart showing a process for requesting media from a media server in accordance with an embodiment of the invention is shown in FIG. 2. The process 40 includes obtaining (42) the index of the media file from the media server. A location from which to start playing the media file is then determined (44). In a number of embodiments, all files commence playing at the start of a media sequence. In several embodiments, the media file can include one or more menus that enable a user to select different locations from which to commence viewing one or more media sequences. Once a location has been determined, the media information required to commence playing the media from the determined location is requested (46) and played back (48) upon receipt. The process involves listening (50) for user instructions. In the event that a user does not provide an instruction, the system continues playing the media in accordance with previous instructions received from the user. When a user provides an instruction, the process determines (52) whether the instruction is to cease playing. Otherwise, the process involves determining (54) the media required to comply with the instruction and requesting (46) the required media. The process continues until the user provides an instruction to stop playing the media or the end of the media sequence is reached.

Media servers in accordance with embodiments of the invention can support progressive playback and trick play functions by simply storing media files and receiving requests for specific byte ranges within the media file. The client application can determine the appropriate byte ranges and the media server simply responds to the byte range requests. A client application that is configured to determine appropriate byte ranges in response to user instructions can be implemented in a variety of ways.

Figure 3:
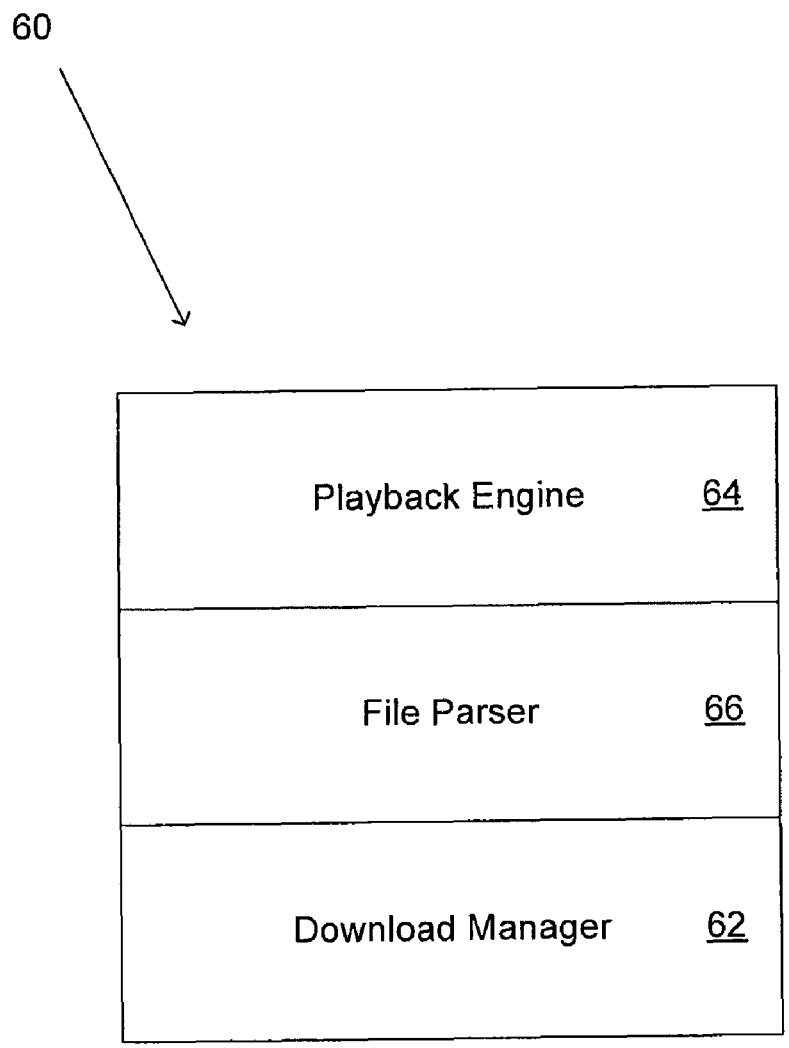
FIG. 3 is a conceptual illustration of a client application configured to request byte ranges from a remote server and to support "trick play" functions in accordance with an embodiment of the invention.

A client application implemented using three abstraction layers in accordance with an embodiment of the invention is illustrated in FIG. 3. The client application 60 includes a download manager 62 that is responsible for coordinating the downloading of specific byte ranges of a file from a remote server. The playback engine 64 is a high level process that coordinates the playback of a media file in response to user interactions. When a media file is being played, the playback engine uses an index of the media file to determine the portions of the media file required to continue playing the media and/or to respond to user instructions. A file parser 66 interfaces between the playback engine 64 and the download manager 62. The file parser maps high level data requests from the playback engine to specific byte ranges that can then be requested using the download manager. The implementation of download managers, file parsers and playback engines in accordance with embodiments of the invention is discussed below. In many embodiments, client applications are configured using alternative architectures that are configured to use an index to a media file to convert user instructions into byte requests that are provided to a remote media server.

Figure 4:
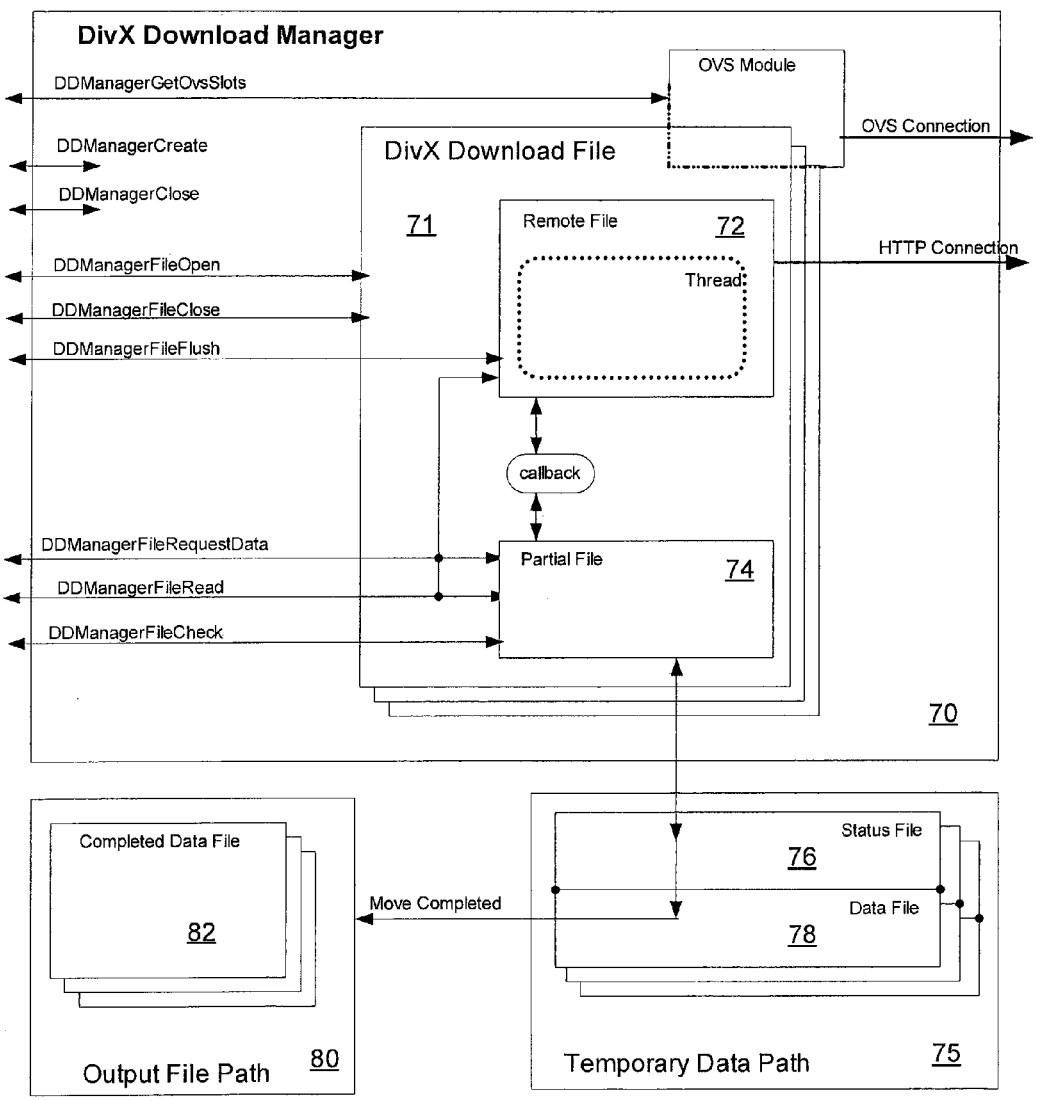
FIG. 4 is a conceptual illustration of a download manager in accordance with an embodiment of the invention.

A download manager in accordance with an embodiment of the invention is illustrated in FIG. 4. As discussed above, the download manager is responsible for communicating with one or more media servers and obtaining specific byte ranges of media from media files stored on the media servers. The download manager 70 shown in FIG. 4 is configured to instantiate a remote file object 72 and a partial file object 74 to assist with the downloading of media files. The remote file object 72 handles the communications associated with requesting byte ranges of a file from a media server and maintains a queue of the byte ranges that have been requested. The partial file object 74 handles storage of the data downloaded from the media server. The partial file object 74 establishes a temporary data path 75 for a file being downloaded by the download manager.

The temporary data path 75 includes a data file 78 and a status file 76. The data file 76 contains data received from the media server. The status file contains a mask of the data file, where each bit within the mask corresponds to a block of fixed size within the data file. As blocks are downloaded, bits within the mask are set. A status file can also include a region for external data, which can include information, such as the last modified server timestamp, that can be used by the download manager to determine if any partially downloaded data has expired. When the entire media file has been downloaded, the download manager creates an output file path 80 and fully downloaded version of the remote file 82 is output to the download path. At which point, the client application can use the local file to play the media and support "trick play" functions in a conventional manner.

Depending upon the size of the file being downloaded, the data file can be several gigabytes in length. A common file allocation approach is to allocate zeros for every byte within the file, which can take several minutes to complete for large files. Latency during data file allocation can be reduced by allocating the file as a sparse file that only uses the number of bytes actually written to the file. When a sparse file is used, the file allocation process requires very little time. In other embodiments, other file allocation approaches can be used that weight latency against the needs of the download manager.

The block size of the data file (as represented in the status file) determines the granularity by which data can be downloaded. A small block size is typically more efficient in terms of downloading only needed bytes. However small block sizes can lead to a large mask size. In many embodiments, a block size of 128 is used to compromise between efficiency and mask size. In other embodiments, other block sizes determined based upon the requirements of the application are utilized.

Figure 5:
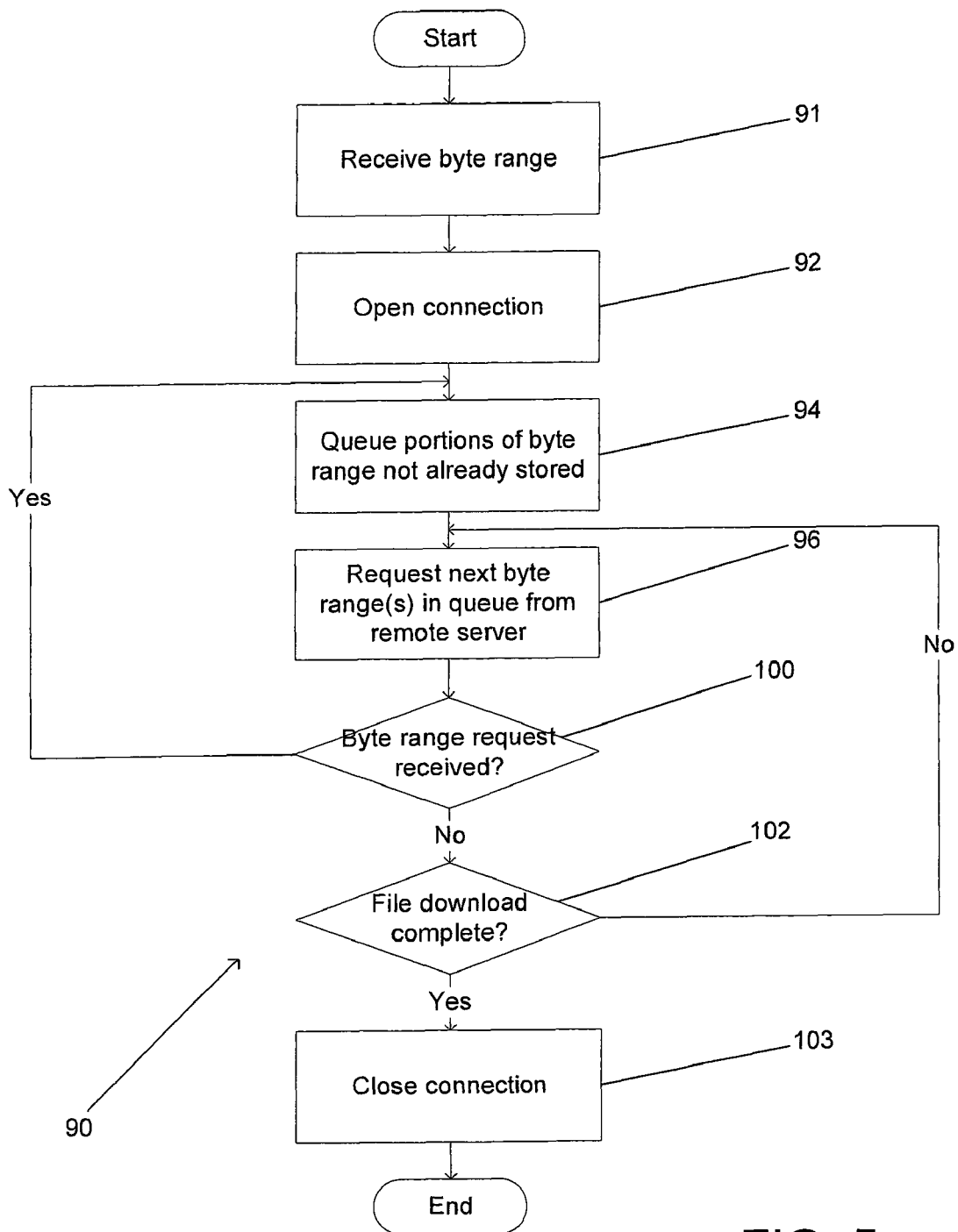
FIG. 5 is a flow chart showing a process for requesting byte ranges from a media server in accordance with an embodiment of the invention.

A process for requesting data using the download manager in accordance with an embodiment of the invention is shown in FIG. 5. The process 90 commences when a request is received (91) to download a byte range from a media file stored on a remote server. When a download manager similar to the download manager shown in FIG. 4 is used, the download manager instantiates a remote file object and a partial file object and creates the necessary supporting files. A connection is established (92) with the remote server, the requested byte range is placed (94) in a request queue and is then requested (96). As more byte ranges are received, the process determines whether any of the bytes within a requested byte range have been previously downloaded and only places portions of the byte range that have not been previously downloaded in the request queue.

When a download manager similar to that shown in FIG. 4 is used to implement the process 90 in FIG. 5, the mask in the status file 76 is used to determine the requested bytes that have already been stored in the data file 78 and the remaining bytes that should be requested. Each byte range request has associated overhead, therefore, a number of embodiments of the invention include multiple byte ranges in a byte range request and/or search the request queue for byte ranges proximate the byte range at the front of the queue and request a large byte range that encompasses all of the proximate byte range. In several embodiments, the process opens multiple connections to increase download data rate and/or accommodate servers that limit the number of byte requests that can be made via a connection. Again, opening connections has associated overhead. Therefore, the number of connections can be limited based upon a limit appropriate to a particular application (e.g. 5).

When a determination (100) is made that there are no more byte ranges in the request queue, the process determines (102) whether the entire file has been downloaded. In the event that the entire file has not been downloaded, the process requests missing bytes from the partially downloaded file object. Once the entire file is downloaded, the downloaded file is exported to its output directory and the connection with the remote server is closed (104) and the process is complete. In many embodiments, the data file is exported only after playback is complete.

Although a specific process for downloading byte ranges is shown in FIG. 5, variations on this process and/or alternative processes that enable the downloading of specific byte ranges and assembly of a data file can be used in accordance with embodiments of the invention. In addition, processes can involve any of a variety of optimizations to minimize the impact of communication overhead on media playback.

When a user provides a "trick play" instruction, previously requested byte ranges may no longer be required in order to continue playing media in the manner instructed by the user. Download managers in accordance with a number of embodiments of the invention possess the ability to flush the queue of pending byte range requests and establish a new queue of byte range requests. An advantage of flushing a request queue is that there is no latency associated with waiting until previously requested byte ranges have been requested prior to downloading the now higher priority byte ranges. In a number of embodiments, closing the connection with the remote server and opening a new connection further reduces latency. Closing the connection can remove latency associated with waiting for the media server to respond to pending download requests prior to the media server responding to new download requests.

Figure 6:
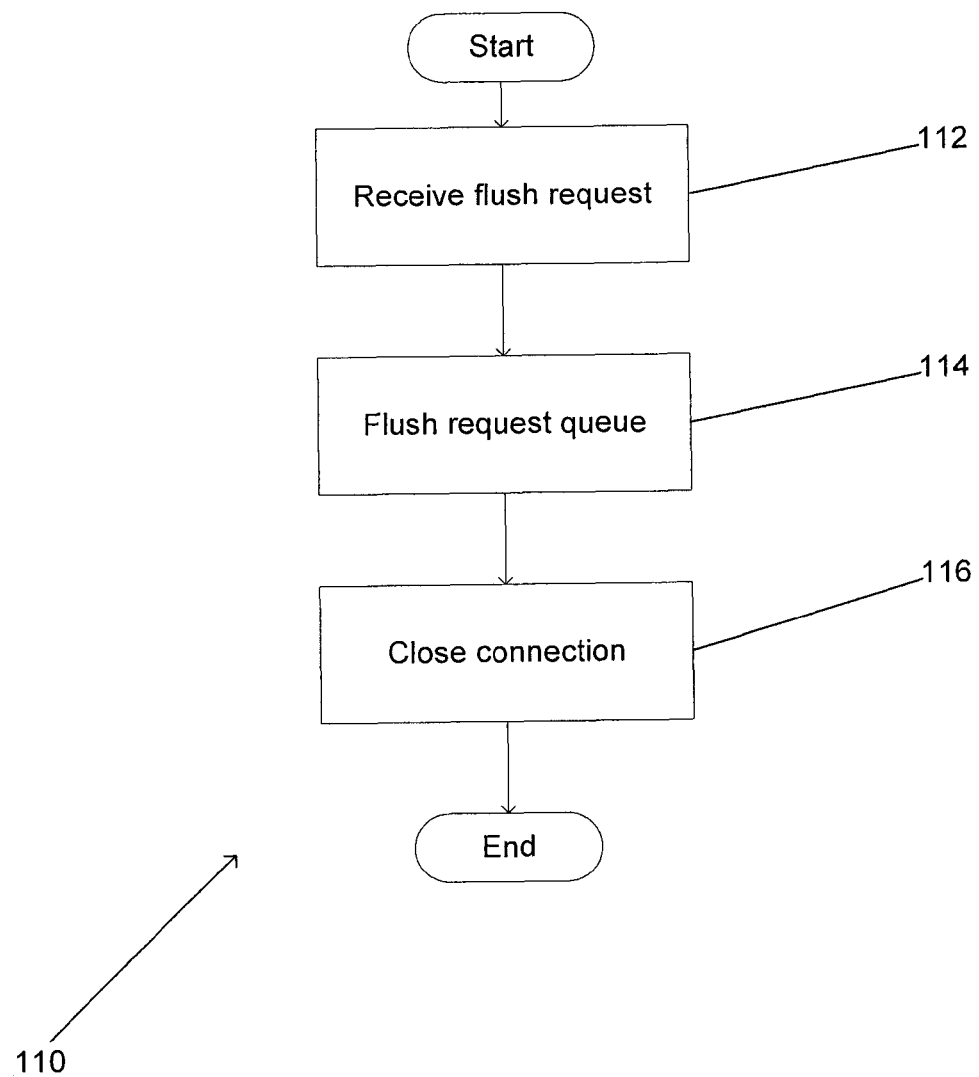
FIG. 6 is a flow chart showing a process for flushing a connection with a media server in accordance with an embodiment of the invention.

A process for flushing a request queue in accordance with an embodiment of the invention is shown in FIG. 6. The process 110 includes receiving (112) a flush request, flushing (114) the request queue and closing (116) the connection with the media server. In many embodiments, other processes can be used to reduce latency when "trick play" requests are received that eliminate the immediate need for portions of a media file previously requested and create an immediate need for portions of a remote media file that have not been previously requested.

Figure 7:
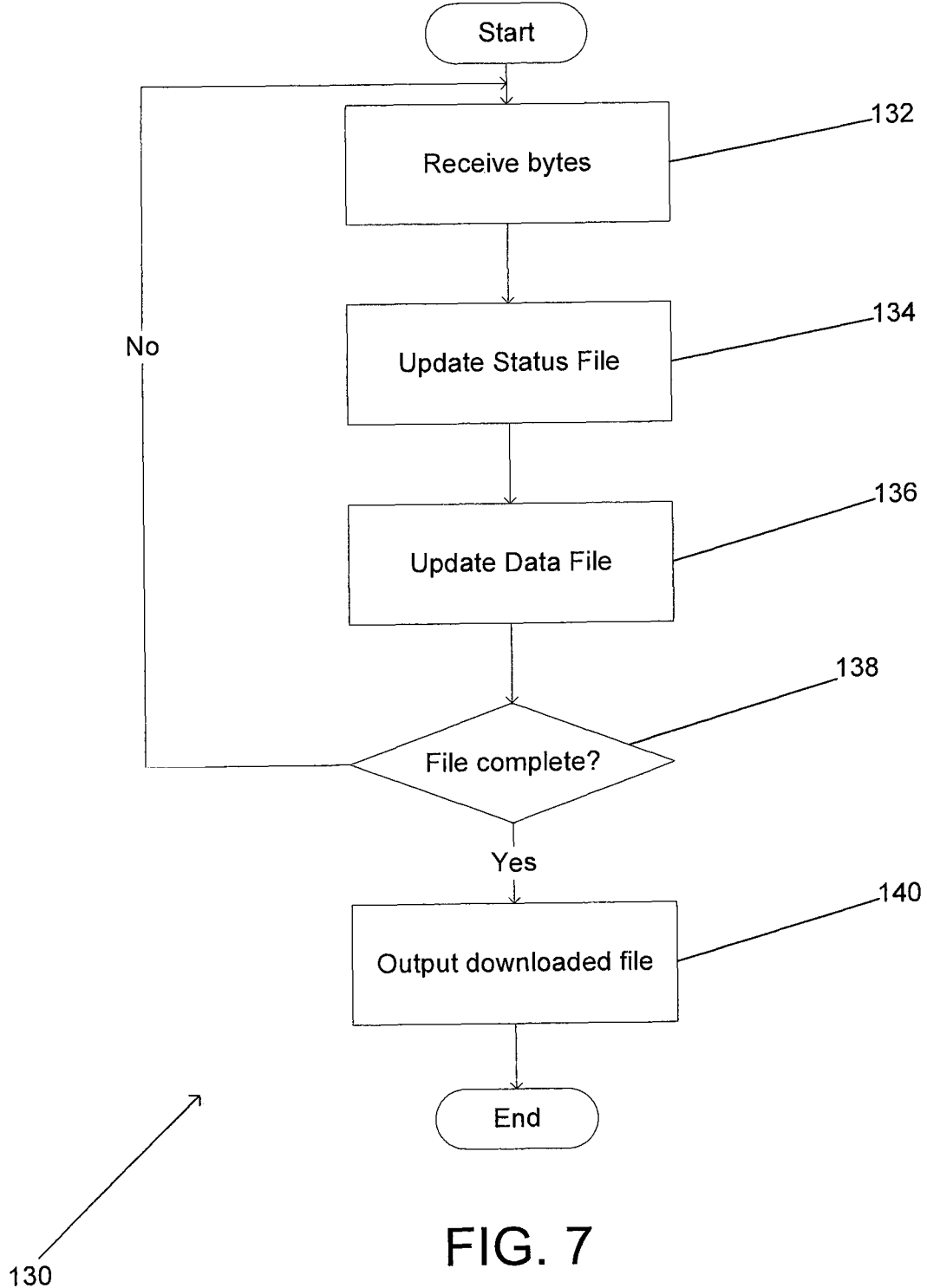
FIG. 7 is a flow chart showing a process for building a data file during the non-sequential downloading of byte ranges of the data file in accordance with an embodiment of the invention.

When data is received by the download manager, the status file and the data file are both updated to reflect the received bytes. A process for handling receiving bytes from a remote media server in accordance with an embodiment of the invention is shown in FIG. 7. The process 130 includes receiving (132) bytes, updating (134) the mask in the status file and updating (136) the data file. A determination (138) is then made as to whether the entire file has been downloaded. In the even that the entire file has not been downloaded, the process waits to receive additional bytes. When the entire file has been downloaded, the downloaded media file is exported (140) to its output directory. In other embodiments, other processes are used to organize received byte ranges.

A file parser in accordance with embodiments of the invention is used to convert high level requests from a playback engine into byte range requests for the download manager and to pass byte ranges downloaded by the download manager to the playback engine. When a device commences progressively playing a media file stored on a remote media server, the file parser accesses the file and downloads information concerning the content of the media file. Media files such as the media files described in U.S. patent application Ser. Nos. 11/016,184 and 11/198,142, incorporated by reference above include menu information and/or information from multiple media sequences (i.e. distinct media presentations). The file parser obtains menu information and information concerning the media sequences. When a media sequence is selected by the user, the file parser obtains an index to the selected media sequence and the index is used to identify the byte ranges within the remote media file to request as the media sequence is played.

Figure 8:
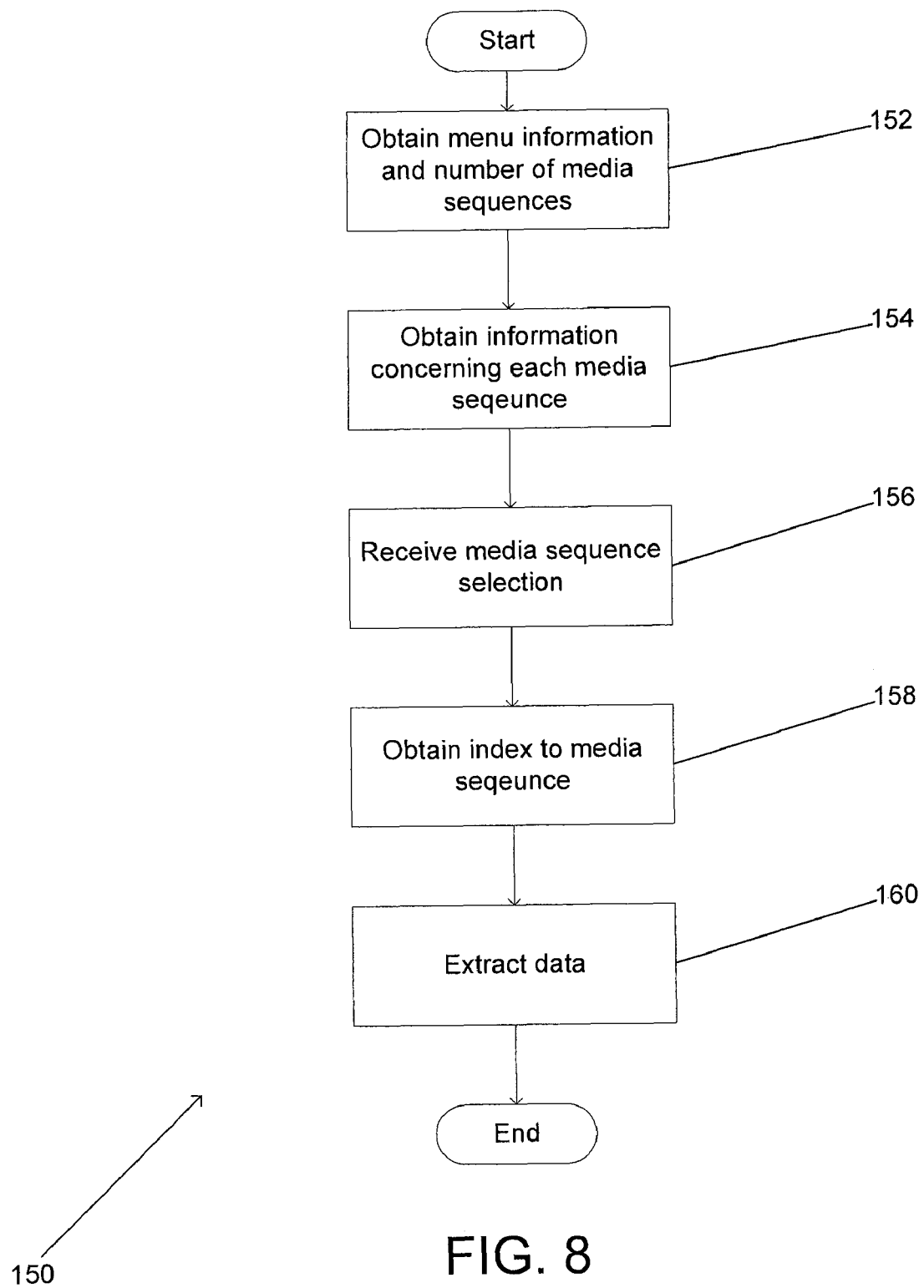
FIG. 8 is a flow chart showing a process that can be used by a file parser to identify menu information and media sequences within a remote media file and to extract information from the file in accordance with an embodiment of the invention.

A process in accordance with an embodiment of the invention for determining the media sequences contained within a remote media file and extracting selected media in accordance with an embodiment of the invention is shown in FIG. 8. The process 150 includes obtaining (152) any menu information contained within the file and information concerning the number of distinct media sequences within the media file. In embodiments where a file parser is used in conjunction with a download manager, the file parser uses knowledge concerning media formats to select bytes of information to request from the media file using the download manager. The menu information and/or the information concerning the number of media sequences can be used to obtain (154) information concerning each of the media sequences. Information that can be useful includes information concerning the title of the media sequence, the format of the media sequence, the number of alternate audio tracks in the media sequence, the presence of one or more subtitle tracks in the media sequence and/or any additional information that could be useful to a user in the selection of a media sequence or to a decoder in the decoding of the media sequence. When the media is formatted in an AVI format or in a format similar to any of the file formats described in U.S. patent application Ser. Nos. 11/016,184 and 11/198,142, information concerning each of the media sequences can be downloaded by downloading the RIFF header for each media sequence. Once information concerning the media sequences has been obtained, a selection (154) can be made concerning the media sequence that is to be played. When the media file contains a single media sequence, the decision can be automatic. When the media file contains multiple sequences, the decision can be made based upon a user instruction that is obtained via a menu interface generated using menu information obtained from the remote media file by the file parser. The file parser uses the information obtained concerning the media sequence to direct the download manager to download a byte range corresponding to an index (156) for the media sequence. The file parser can use the index to extract (158) data from the remote file. The player engine determines the data that is extracted by the file parser. The manner in which the data is extracted depends upon the format of the media file. When the media file is formatted in a media format that utilizes chunks, the file parser uses the index to convert a chunk reference into specific byte ranges that can be retrieved using the download manager. When other formats are used, the file parser uses byte mappings appropriate to the file descriptive information available to the file parser. In addition to requesting byte ranges, file parsers in accordance with embodiments of the invention can communicate with a download manager to check on the status of a particular request and can provide downloaded bytes to the playback engine.

Figure 9:
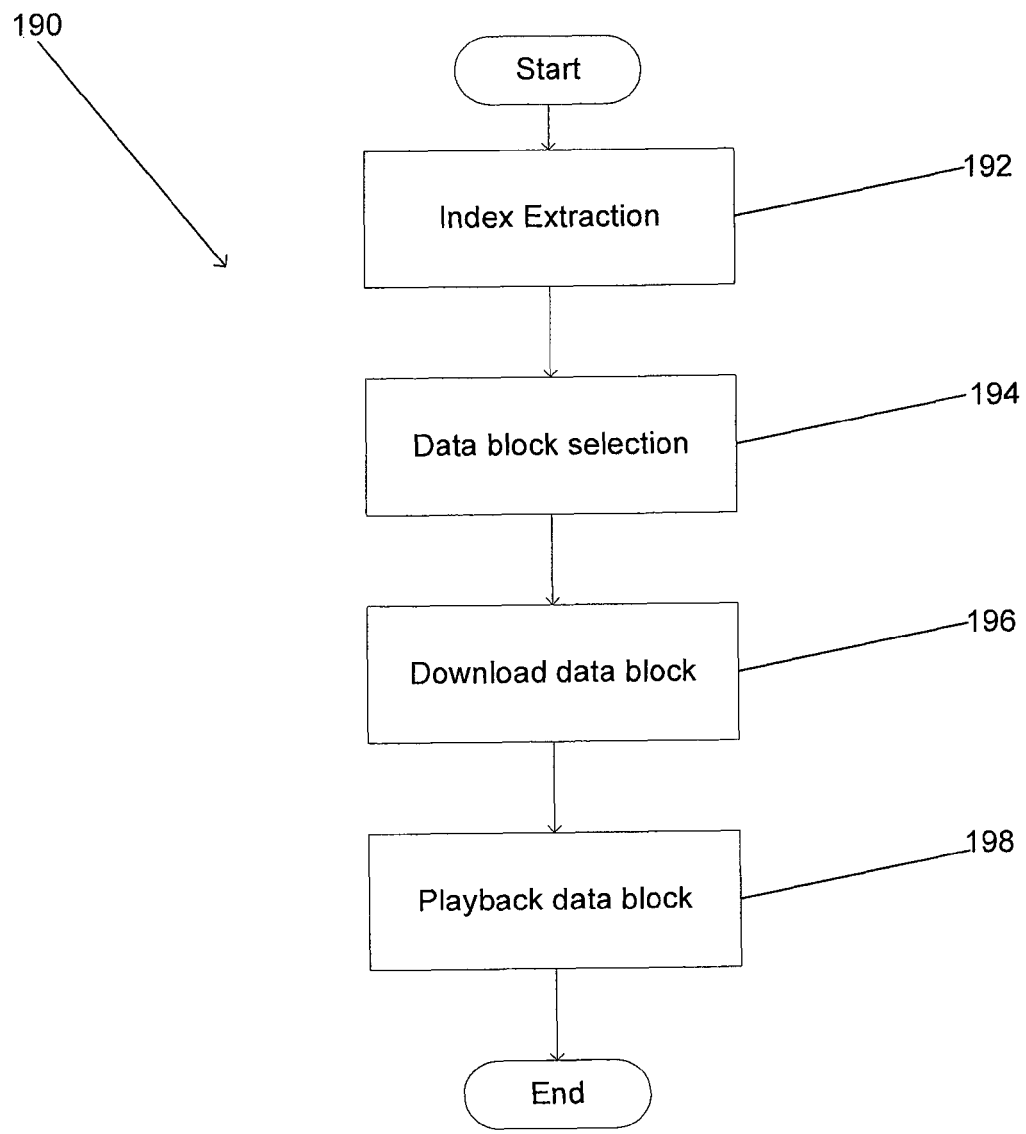
FIG. 9 is a flow chart showing a process used by a playback engine to obtain data chunks from a remote media file formatted using a container format that utilizes chunks in accordance with an embodiment of the invention.

The primary goal of the playback engine, when progressively playing a remote file, is to always maintain a queue of media information required to play the file in the manner requested by the user. When a media file includes an index, the playback engine can refer to the index to determine the media information required to play the media file in the manner requested by the user. A process in accordance with an embodiment of the invention that is used to obtain media from a file that is formatted to represent the media as chunks of information is shown in FIG. 9. The process 190 includes obtaining (192) an index from the remote media file. In embodiments where the playback engine requests information via a file parser, the playback engine can provide an instruction to the file parser to obtain the index and the file parser can extract the necessary information using the download manager. The playback engine then selects (194) chunks based upon instructions, including "trick play" instructions, received from the user and provides instructions to the file parser to download (196) the selected chunks. In a number of embodiments, the playback engine selects chunks based upon an earliest deadline first selection strategy. Chunks from unused audio tracks and unused subtitle tracks multiplexed within the media sequence can be ignored. In many embodiments, media chunks are requested prior to the downloading of the entire index. Media is typically played form the start of a media sequence, therefore, chunks from the start of the media sequence can be downloaded as the index is downloaded. When the playback engine receives the chunks from the file parser, the chunks are queued and provided to an appropriate decoder to enable the playing (198) of the media. Playback of the movie can begin once enough of the movie has been downloaded. The buffered length can be determined by the length of the playback list shared with the chunk download component.

The chunk selection process described above with respect to FIG. 9 maintains a queue of requested chunks. The queue can be maintained as a list of index entries for the requested chunks. The chunk download process polls the download status of the requested chunks. Once downloaded, a chunk is removed from the queue of requested chunks and the downloaded chunk is delivered to the chunk playback process.

When a "trick play" instruction is received, the playback engine selects media information appropriate to the "trick play" instruction. For example, a playback engine that receives a fast-forward or rewind instruction can request only key frames (i.e. complete frames) that are spaced throughout the media sequence at a timing determined by the rate of the trick play function. In many embodiments, the spacing in time is 0.1× the trick frame rate to provide a playback rate during trick play of 10 key frames per second. In other embodiments, various other algorithms are used to determine the media to request. Once the chunks containing the key frames have been identified, the playback engine requests the chunks using the file parser and download manager.

While the above description contains many specific embodiments of the invention, these should not be construed as limitations on the scope of the invention, but rather as an example of one embodiment thereof. Much of the discussion provided above assumes a media file having an index identifying the location of different pieces of media information within the media file. In many embodiments, hierarchical indexes and/or other index formats are included in media files and the playback engine and file parser are configured to accommodate the particular index structure. In several embodiments, the client application is configured to accommodate multiple file formats including file formats that do not possess indexes, but utilize other information to describe the content of the media file. Accordingly, the scope of the invention should be determined not by the embodiments illustrated, but by the appended claims and their equivalents.

What is claimed is:

1. A method of progressively playing back a media sequence by a playback device stored as a media file on a remote server, comprising:
    obtaining information concerning the content of the media file from the remote server;
    identifying a starting location within the media sequence by a playback device;
    identifying byte ranges of the media file corresponding to media required to play the media sequence from the starting location by the playback device;
    requesting the byte ranges required to play the media sequence from the starting location by the playback device from the remote server;
    maintaining a mask of the portions of the media file that have been downloaded;
    buffering received bytes of information pending commencement of playback;
    playing back the buffered bytes of information;
    receiving a user instruction;
    identifying byte ranges of the media file corresponding to media required to play the media sequence in accordance with the user instruction by the playback device;
    identifying that at least a portion of a byte range required to play the media in accordance with the user instruction has already been downloaded using the mask;
    flushing previous byte range requests;
    requesting only the portions of the required byte ranges that have not already been downloaded from the media server to play the media in accordance with the user instruction on the playback device from the remote server.

2. The method of claim 1, further comprising:
    storing downloaded bytes in a data file; and
    outputting the downloaded media file when all bytes of the media file have been downloaded.

3. The method of claim 1, wherein the data file is a sparse data file.

4. The method of claim 1, wherein:
    the media file contains a plurality of media sequences and menu information; and
    identifying a starting location within the media sequence further comprises:
        displaying menu information;
        receiving a user instruction indicative of the selection of the media sequence; and
        receiving a user instruction indicative of a starting location within the media sequence.

5. The method of claim 1, wherein:
    the media sequence includes a plurality of interchangeable audio tracks;
    identifying a starting location within the media sequence further comprises selecting an audio track; and
    identifying byte ranges of the media file corresponding to media required to play the media sequence from the starting location further comprises selecting byte ranges that do not include the audio tracks that were not selected.

6. The method of claim 1, wherein:
    the media sequence includes a plurality of interchangeable subtitle tracks;
    identifying a starting location within the media sequence further comprises selecting a subtitle track; and
    identifying byte ranges of the media file corresponding to media required to play the media sequence from the starting location further comprises selecting byte ranges that do not include the subtitle tracks that were not selected.

7. The method of claim 1, wherein:
    the sequence includes key frames; and
    identifying byte ranges of the media file corresponding to media required to play the media in accordance with the user instruction further comprises:
        identifying a sequence of key frames in response to a predetermined user instruction; and
        identifying byte ranges of the media file corresponding to the identified key frames.

8. A system for progressive playback of a media file, comprising:
    a media server;
    a client; and
    a network;
    wherein the client and the media server are configured to communicate via the network;
    wherein the client is configured to send requests using byte ranges identified by the client for at least one portion of the media file to the media server;
    wherein the server is configured to provide requested portions of the media file to the client;
    wherein the client is configured to receive user instructions concerning the playback of the media file and to request portions of the media file using identified byte ranges corresponding to the received user instructions that have not been downloaded and that are required to comply with the playback instructions from the media server; and
    wherein the client is configured to store a file map and a data file;
    wherein the file map contains a mask indicating the portions of the media file that have been downloaded; and
    wherein the data file contains the downloaded portions of the media file.

9. The system of claim 8, wherein proximate portions of the media file are grouped and the groups are requested on an earliest deadline first basis.

10. The system of claim 8, wherein the client is configured to maintain a queue of requested portions of the media file.

11. The system of claim 10, wherein:
    the client and the server are configured to communicate via at least one connection; and
    the client is configured to flush the queue of requested portions of the media file and break at least one of the connections in response to the receipt of a predetermined user instruction.

12. The system of claim 8, wherein the data file is a sparse file.

13. The system of claim 8, wherein:
    the media file includes a media sequence and an index;

the client comprises:
- a playback engine configured to obtain the index and determine the portions of the media sequence required to comply with user playback instructions;
- a file parser configured to use the index to map the portions of the media sequence to portions of the media file; and
- a download manager configured to communicate with the media server to download portions of the media file.

14. A media player, comprising:
- a user interface configured to receive user instructions;
- a storage device configured to store at least one media file received from a remote server;
- a network connection;
- a download manager configured to asynchronously request at least one byte range of a remotely stored media file from a remote server via the network connection;
- a playback engine configured to determine portions of a remotely stored media file that must be downloaded in response to user instructions received via the user interface; and
- a file parser configured to translate requests for portions of a remotely stored media file to byte ranges and to provide the byte ranges to the download manager to include in a request to a remote server; and wherein the download manager is configured to create a status file containing a map of blocks of a media file that have been downloaded; and wherein the download manager is configured to create a data file in which to store blocks of a downloaded media file.

15. The media player of claim 14, wherein the download manager is configured to maintain a queue of requested byte ranges.

16. The media player of claim 15, wherein the download manager is configured to flush the queue.

17. The media player of claim 14, wherein the playback engine is configured to generate a menu using menu information obtained from a remote media file.

18. The media player of claim 17, wherein the playback engine is configured to receive a selection of one of a plurality of media sequences in a remote media file via the menu.

19. The media player of claim 17, wherein the playback engine is configured to receive a selection of one of a plurality of audio tracks for a media sequence in a remote media file via the menu.

20. The media player of claim 17, wherein the playback engine is configured to receive a selection of a subtitle track for a media sequence in a remote media file via the menu.

* * * * *